Jan. 15, 1952  J. E. CONZELMAN, JR., ET AL  2,582,234
PROSTHETIC HAND
Filed June 28, 1948  5 Sheets-Sheet 1
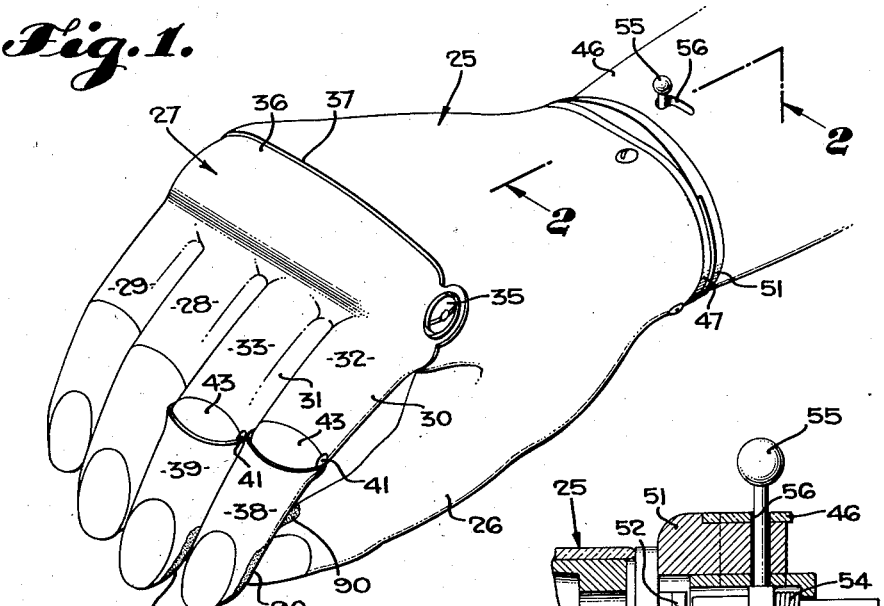
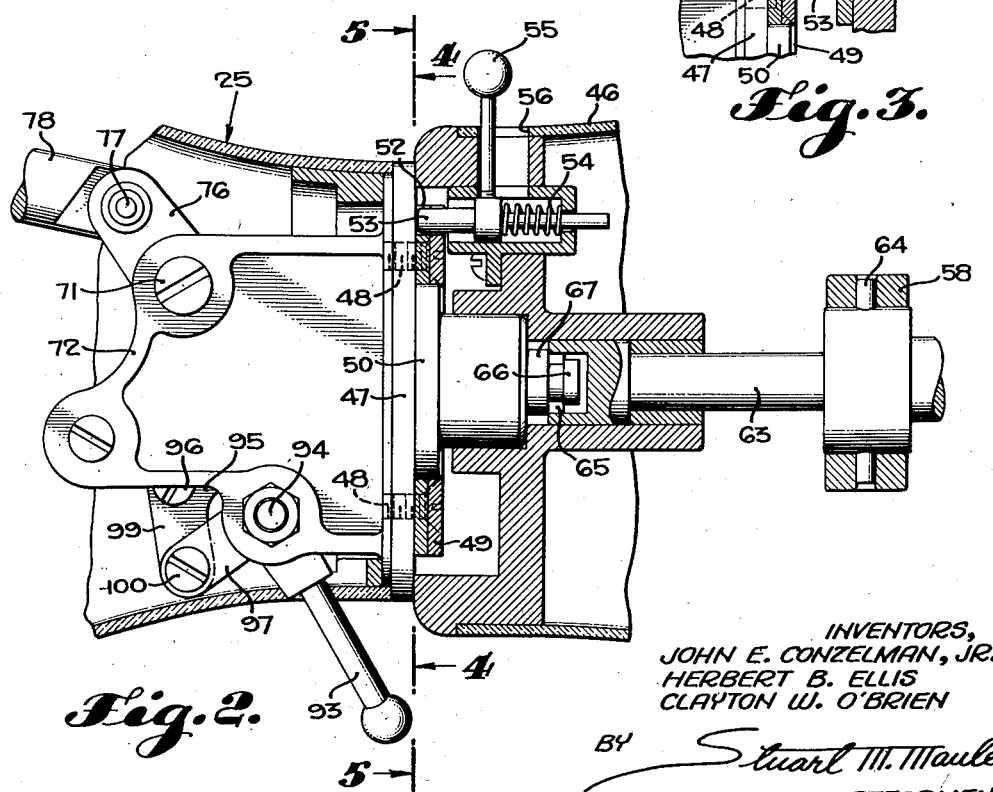
INVENTORS,
JOHN E. CONZELMAN, JR.
HERBERT B. ELLIS
CLAYTON W. O'BRIEN
BY Stuart M. Maule
ATTORNEY Jan. 15, 1952  J. E. CONZELMAN, JR., ET AL  2,582,234
PROSTHETIC HAND
Filed June 28, 1948  5 Sheets-Sheet 2
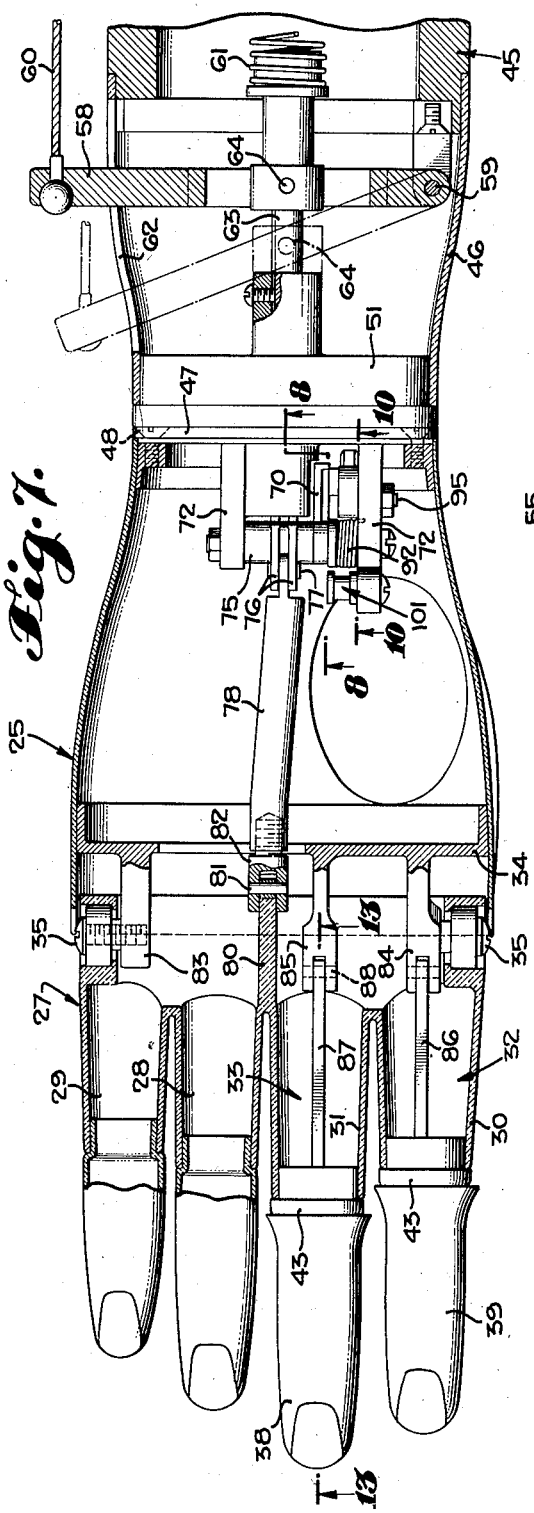
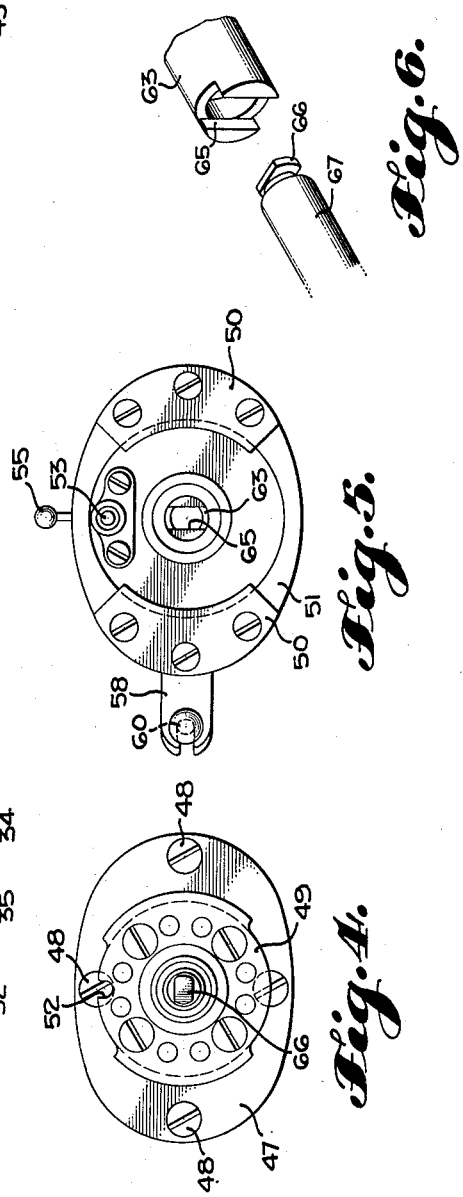
INVENTOR
JOHN E. CONZELMAN, JR.
HERBERT B. ELLIS
CLAYTON W. O'BRIEN
BY Stuart M. Maule
ATTORNEY

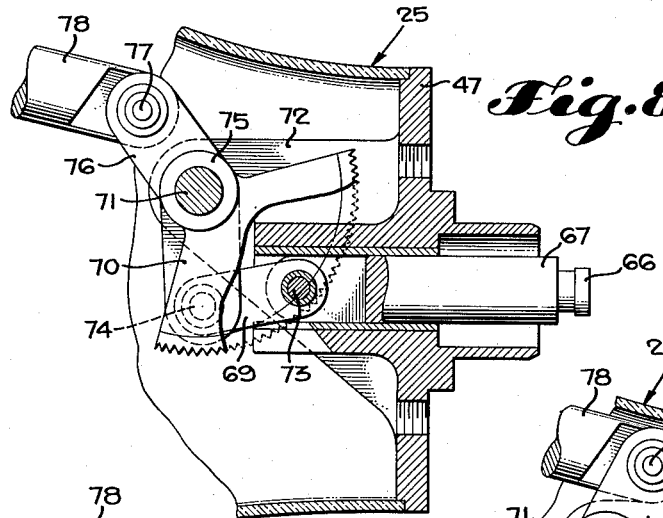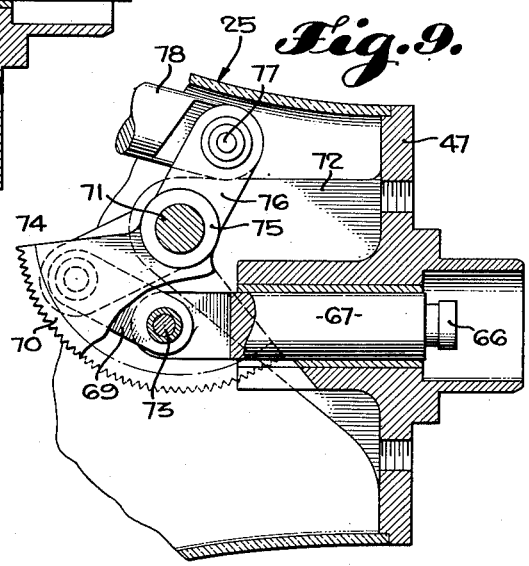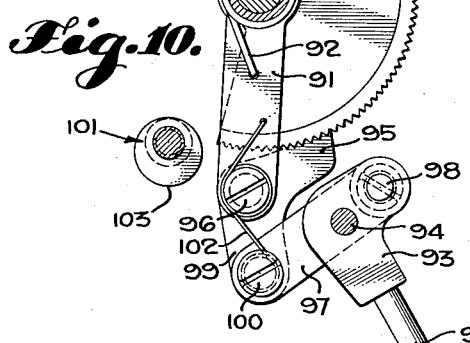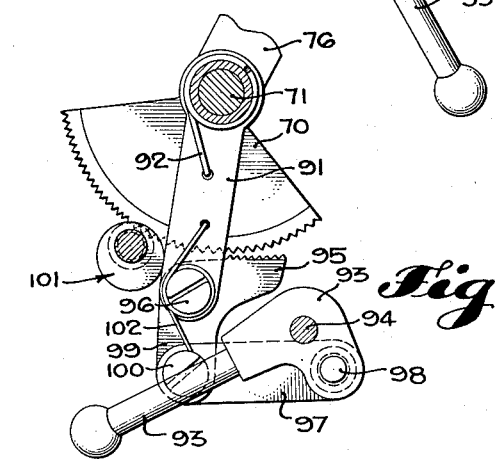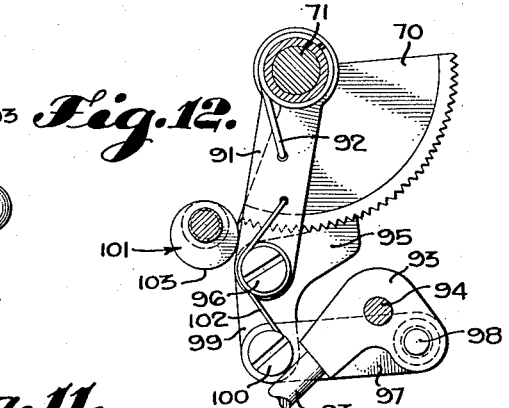

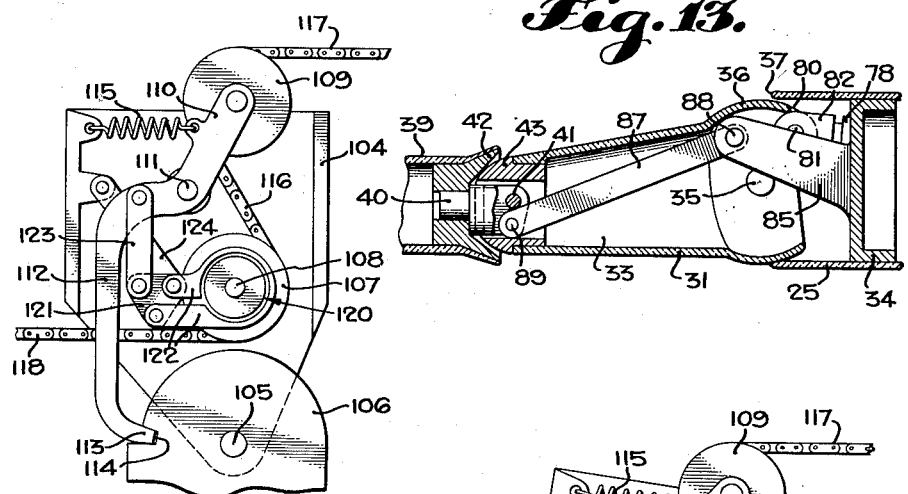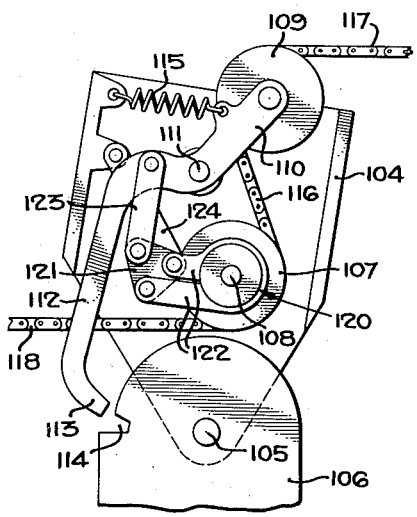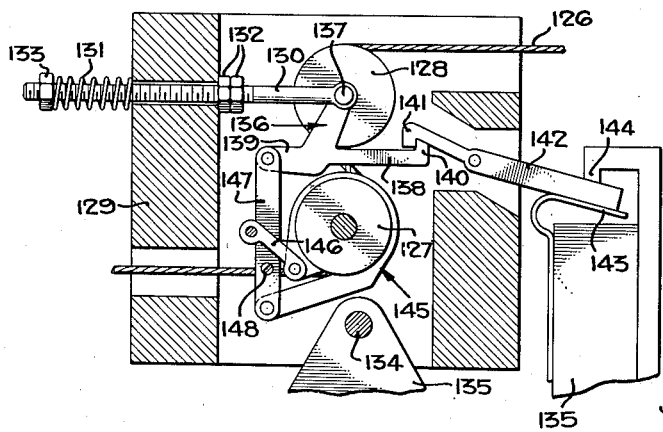

Jan. 15, 1952     J. E. CONZELMAN, JR., ET AL     2,582,234
PROSTHETIC HAND
Filed June 28, 1948     5 Sheets-Sheet 5
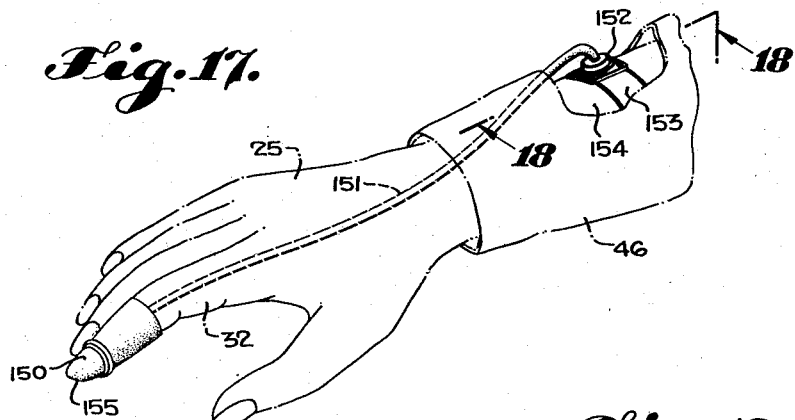
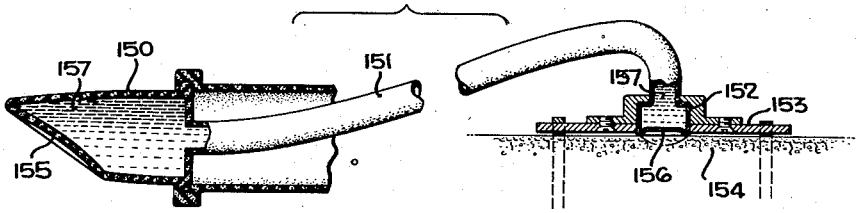
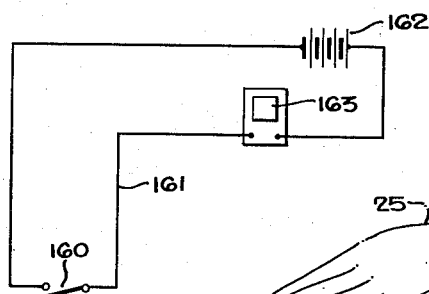
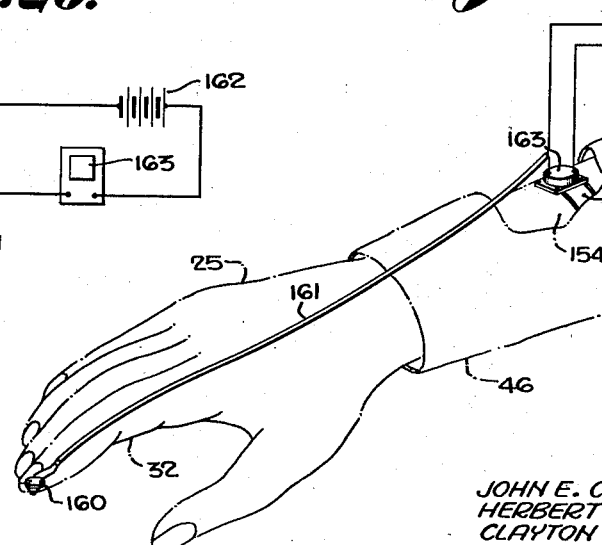
INVENTORS,
JOHN E. CONZELMAN, JR.
HERBERT B. ELLIS
CLAYTON W. O'BRIEN
BY
Stuart M. Maule
ATTORNEY Patented Jan. 15, 1952

2,582,234

UNITED STATES PATENT OFFICE 2,582,234

PROSTHETIC HAND

John E. Conzelman, Jr., Sierra Madre, Herbert B. Ellis, La Canada, and Clayton W. O'Brien, Los Angeles, Calif.

Application June 28, 1948, Serial No. 35,634

2 Claims. (Cl. 3—12)

This invention relates to prosthetic devices, and more particularly to prosthetic hands, and has as an object the provision of a serviceable prosthesis of natural appearance as a replacement for a hand which has been amputated at or above the wrist.

Modern surgery and intensive efforts to rehabilitate persons who have lost parts of their limbs through warfare, disease, or accident, have resulted in great advances in the science of prosthetics. The immobile gloved hand, incapable of useful action, and the unsightly though remarkably efficient "hooks" are both tending to give place to artificial hands which combine appearance and utility to a degree materially restoring the morale and the capabilities of the amputee. The technical improvements in the prosthetic hands themselves have been accompanied by advances in the controls by which the devices are operated, one of the most notable of such steps being that of cineplasty, or utilization of the muscles within a stump to impart some of their normal function to an appropriate prosthesis. Arrangements of harnesses operated by movements of the shoulders and of the stump relatively to the shoulder have also been improved until a greater number of controlled movements of the prosthesis are now possible than could be obtained with earlier harnesses.

To take full advantage of the above-mentioned advances in the prosthetic controls, the artificial hands operated thereby must be fairly complicated articulated mechanisms. To relieve muscular strain and to obviate the necessity of maintaining the upper arms and shoulders in awkward positions, the hands require locking devices by which a grip once exerted may be held without undue effort. It is furthermore desirable that the grip should be as powerful as the occasion may require. Yet in the absence of tactile sensation, the power exerted may ordinarily be judged only by muscular fatigue, which of course is to be avoided. And while each added feature of utility increases the number, and often the bulk, of the parts of the prosthesis, it remains a requirement that the prosthesis shall not be excessively heavy and shall be of natural appearance.

It is accordingly a further object of our invention to provide a prosthetic hand sufficiently articulate to afford an adequate grip upon an object and designed to move in a manner closely simulating the movement of a natural hand.

Another object of the invention is to provide a prosthetic hand having a minimum system of operating linkage consistent with affording an adequate grip, and with that system so disposed as to place the center of gravity of the prosthesis high towards the elbow, to minimize the effective or apparent weight of the prosthesis.

Yet another object of the invention is to provide a prosthetic hand having a simple and effective locking device by which a grip once established upon an object may be maintained without further muscular effort and including in the locking device means for tensing the grip so established and locked.

Still another object of the invention is to provide a prosthetic hand which may be easily and quickly detached from the forearm stump or attached thereto and which has its control mechanism so disposed and arranged that it may be actuated either by shoulder harness or by cordage cineplastically secured to one or more of the muscles of the stump.

A further object of the invention is to provide a prosthetic hand having a force-multiplying mechanism permitting rapid articulation of the fingers in gripping direction in the absence of resistance, and increasing the applicable force with reduced but not terminated motion when a predetermined resistance is encountered, whereby the prosthesis is particularly adapted to the limits of motion and force imposed by cineplastic operation.

It is another object of the invention to provide a prosthetic hand having a sensory device for transmitting an indication of contact to a sensitive part of the amputee's body.

Still another object of the invention is to provide a prosthetic hand in which the aforesaid sensory device not only transmits an indication of contact, but also indicates to the amputee the degree of pressure exerted by the hand.

The invention possesses other objects and features of advantage, some of which, with the foregoing, will be set forth in the following description of the preferred forms of my invention which are illustrated in the drawings accompanying and forming part of the specification. It is to be understood that I do not limit myself to the showing made by the said drawings and description, as I may adopt variations of the preferred forms within the scope of my invention as set forth in the claims.

Referring to the drawings:

Figure 1 is an elevational view in perspective of a prosthetic hand embodying the principles of this invention, the hand being shown in the clamped or gripping position.

Figure 2 is a longitudinal vertical sectional view through the wrist portion of the hand shown in Figure 1, and on an enlarged scale, the plane of section being indicated by the line 2—2 of Figure 1, with the direction of view as indicated, and is illustrative of a quick-locking mechanism controlling a bayonet lock by which the hand is secured to the stump cuff.

Figure 3 is a fragment of the view of Figure 2, with the quick-locking mechanism shown in the unlocking position.

Figure 4 is a transverse section taken on the plane of section indicated by the line 4—4 of Figure 2, at a slightly reduced scale and with the direction of view as indicated, and shows the hand or distal member of the bayonet lock.

Figure 5 is a transverse section taken on substantially the same line as Figure 4, but in the opposite direction of view as indicated by the arrows 5—5 of Figure 2, showing the forearm or proximal member of the bayonet lock.

Figure 6 is a detail in exploded perspective illustrating the clutch or connecting joint between the proximal and distal portions of the operating plunger.

Figure 7 is a top plan view of the prosthesis, partly in section and with parts broken away to show the internal operating mechanism, the parts being in the gripping position as in Figure 1, and the extended position of the actuating lever being shown in broken lines.

Figure 8 is a longitudinal vertical sectional view on an enlarged scale taken on the line 8—8 of Figure 7, showing the operating plunger and its connected linkage in the retracted or gripping position corresponding to Figures 1 and 7.

Figure 9 is a longitudinal vertical sectional view similar to Figure 8, but with the operating plunger in its advanced or released position to permit extension of the fingers.

Figure 10 is a longitudinal vertical sectional view taken on the line 10—10 of Figure 7, showing a finger-locking and grip-boosting mechanism in locking and boosting position.

Figure 11 is a fragmentary sectional view similar to Figure 10, but showing the mechanism released.

Figure 12 is another view similar to Figures 10 and 11, and showing the mechanism in finger-locking position, but not constrained to boost the grip of the fingers.

Figure 13 is a longitudinal vertical sectional view illustrative of the finger articulation and the articulating linkage, taken on the line 13—13 of Figure 7.

Figure 14 is an elevational view of a force-multiplier interposed between the operating harness and the operating lever of the prothesis for increasing the power applicable to the finger grip, the parts being shown in relaxed position.

Figure 15 is a view similar to Figure 14, in which the parts of the force-multiplier are in tensed position.

Figure 16 is a view similar to Figure 14, illustrating a modified form of force-multipler.

Figure 17 is a perspective view of our prosthetic hand, illustrating a preferred form of sensory device.

Figure 18 is a sectional view on an enlarged scale, taken in part on the line 18—18 of Figure 17, and in part illustrative of the finger-tip mechanism.

Figure 19 is a perspective view similar to Figure 17, and showing a modified form of sensory device.

Figure 20 is a schematic view of the electrical circuit of the device shown in Figure 19.

Specifically describing the preferred embodiment of our invention, and more particularly referring for the moment to Figures 1 to 7, our improved prosthetic hand comprises a casing 25 having the general form of the upper part of the human hand from the proximal digital joints to the wrist and including a thumb 26 formed integrally therewith in a position of fixed opposition to the fingers. A digital casing 27, forming the third and fourth fingers 28 and 29 and the proximal phalanges 30 and 31 of the index finger 32 and second finger 33, is pivotally secured to a knuckle bar 34 within the casing 25 by pivot screws 35. The proximal portion of the casing 27, representative of the proximal knuckles of the fingers, is slightly expanded in the form of a transverse semi-cylinder 36 which fits within the open distal end 37 of the casing 25 and permits relative movement of the casings 25 and 27 while forming a substantially closed joint of natural appearance (see Figure 13). The distal phalanges 38 and 39 of the index and second fingers respectively are formed separately from the digital casing 27 and are connected thereto by knuckle rods 40 pivoting on pins 41. The phalanges 38 and 39 are belled to form socket members 42 mating with balls 43 on the ends of the phalanges 30 and 31 in ball and socket joints. Thus there is provided a complete semblance of a natural hand with provision for articulation of all four fingers as a unit at the proximal knuckles and of the index and second fingers at the medial knuckles, and completely enclosing and concealing the hereinafter described linkage and operating mechanism extending thereinto.

It will be understood that the hand described above may be, and normally will be, encased in a cosmetic glove which will give a further life-like appearance and will further conceal the articulated joints, but as such a glove forms no part of this invention, it is omitted from the drawings for clarity of illustration.

A stump cuff 45 is secured to the forearm stump of the amputee, as by lacing or other conventional means, and has a casing 46 which extends forwardly to join the casing 25. The rearward end of the casing 25 has an end plate 47 held thereto by screws 48 and to which is secured the male member 49 of a bayonet lock (Figures 4 and 5). The female member 50 of the bayonet lock is secured to an end plate 51 attached to the casing 46. The male member 49 has a slot 52 in that portion of its periphery, preferably the upper portion, which is exposed when the bayonet lock is engaged. The female member 50 supports slidably a pin 53, engageable with the slot 52 to prevent the bayonet lock from being accidentally turned to a disengaging position. The pin 53 is urged to engage the slot 52 by a spring 54 and is manipulated by a handle 55. The handle 55 extends through an angulated slot 56 in the casing 46 which permits it to be moved forwardly into locking position, as urged by the spring 54, or to be retracted and moved to the lateral channel of the slot 56, as shown in Figure 3, there to be retained while the amputee uses his other hand to manipulate the bayonet lock.

The casing 46 serves as a housing for that portion of the prothesis operating mechanism to which muscular force is primarily applied. As herein illustrated, and more particularly shown in Figure 7, this primary operating mechanism comprises a lever 58 pivoted on a fulcrum pin 59 secured to the stump cuff 45 and movable in rearward and forward directions by means of a cable 60 in opposition to a spring 61. The cable 60 may lead to a muscle-motor device such as a shoulder harness, not shown, by which it may be tensed by suitably shrugging the shoulders. Alternatively, the cable 60 may lead to a cineplastic muscle tunnel in the forearm of the amputee, in which event the lever 58 may protrude, as shown, through a slot 62 in the casing 46 and the cable 60 may re-enter the casing 46 or the stump cuff 45 at an appropriate point, or the lever and cable may be entirely housed within the casing 46 and the stump cuff 45. The hereinafter described force-multiplying mechanism may also be housed within the casing 46, with the cable 60 forming a part thereof or being attached to the chain thereof, particularly in the event of cineplastic motivation of the prosthesis. When shoulder harness is used to actuate the prosthesis, the force-multiplying mechanism may be located adjacent the upper arm in order to lessen the weight of distal portions of the arm.

The lever 58 actuates a push rod 63, pivotally secured thereto by a pin 64 and urged to assume a forward position by the spring 61, as shown in broken line in Figure 7. The rod 63 carries on its forward end the female member of a clutch or bayonet lock, shown at 65 in Figure 6, which is engageable with a male member 66 on the rearward end of a plunger 67 mounted in the casing 25. The male members 66 and 49 of the clutch and the connecting bayonet lock are so disposed as to engage simultaneously with the female members 65 and 50, so that the operation of connecting the casing 25 to the casing 46 also connects the plunger 67 to the primary operating mechanism housed in the casing 46, and the plunger is also secured against accidental release by the locking action of the locking pin 53 in the slot 52.

Viewing now Figures 8 and 9, and also Figures 2 and 7, it will be seen that the plunger 67 is connected by a connecting rod 69 to an arcuate rack preferably in the form of a toothed quadrant 70 which pivots upon a shaft 71 transversely mounted within the casing 25 upon brackets 72 secured to the end plate 47. The connecting rod 69 is pivotally attached to the plunger 67 and the quadrant 70 by connecting rod pins 73 and 74, respectively. The hub portion 75 of the quadrant 70 has a pair of upstanding arms 76 between which, on a pivot pin 77, a link 78 is mounted. The link 78 extends forwardly inside the casing 25 and transmits movement of the quadrant 70 to the digital casing 27, to which it is connected, and thence to the movable phalanges 38 and 39.

The link 78 is connected at its forward end to an ear 80 integral with the casing 27 by means of a pivot pin 81 and an adjustable fitting 82. The fitting 82 is threaded into the end of the link 78 so as to make possible a variation in the effective length of the link and thus to vary the initial or extended angle between the casings 25 and 27. The knuckle bar 34 has three forwardly extending lugs, of which the two outer lugs 83 and 84, respectively adjacent the little finger 29 and the index finger 32, receive the screws 35 upon which the digital casing 27 is pivoted. The pivot pin 81 lies above the axis of the screws 35, and forward pressure upon it by the link 78 will consequently cause the casing 27 to rotate towards the thumb 26.

The lug 84 and the intermediate lug 85 also pivotally receive the proximal ends of links 86 and 87 extending to the distal phalanges 38 and 39 of the index finger and second finger 32 and 33. As shown in Figure 13, the lug 85 extends upwardly to provide a pivot point 88 for the link 87 above the axis of the screws 35, and it will be understood that the lug 84 extends upwardly in the same manner and for the same purpose with respect to the link 86. The knuckle rods 40 extend downwardly below the pivot pins 41 to provide pivot points 89 for the distal ends of the links 86 and 87. The links 86 and 87 are therefore held at angles to the straight lines connecting the screws 35 with the pivot pins 41, and when the pins 41 are swung downwardly, the pivot points 89 are swung downwardly in arcs intersecting and passing inwardly of the arcs through which the pins 41 move. Consequently, downward arcuate movement of the digital casing 27 results in relative downward arcuate movement of the distal phalanges 38 and 39 and at an increasing rate of relative movement. The index and second fingers 32 and 33 are thus caused to flex at their medial joints and to close rapidly towards the thumb 26, of course flexing oppositely and departing from the thumb when the direction of movement of the digital casing 27 is reversed.

The grip established between the fingers 32 and 33 and the thumb 26 utilizes the palmar surfaces of the fingers and thumb to grasp an object. Surface contact, rather than line or point contact, is depended upon as a holding means, and the contacting surfaces may be provided with patches of rubber or latex, as shown at 90 in Figure 1, to facilitate a secure grasp.

Having reference now to Figures 10, 11, and 12, a locking device is provided for locking the fingers in any desired position, to relieve the strain upon the muscles, and also for increasing the tension of the grip in the locked position. An arm 91 is rotatably mounted upon the shaft 71 and is biased by a coiled spring 92 to rotate in a clockwise direction, as seen in Figures 10 to 12. A bell crank lever 93 is pivoted on a pin 94 secured in one of the brackets 72; connecting the arm 91 with the bell crank lever 93 is a double linkage comprising a pawl 95 toothed to mesh with the quadrant 70 and disposed in the same plane therewith and pivotally mounted on the distal end of the arm 91 by a pin 96, and a link 97 pivotally mounted on the shorter arm of the bell crank lever 93 by a pin 98 and connected pivotally to an arm 99 of the pawl 95 by a pin 100. The spring 92 urges the arm 91 into contact with a stop bar 101, eccentrically mounted on the bracket 72 and adjustable to regulate the amount of clockwise motion permitted to the arm 91. A second spring 102, having one end affixed to the arm 91 and its other end bearing against the pin 100, urges the pawl 95 to a position out of mesh with the quadrant 70.

In Figure 11, the quadrant 70 and the upstanding arm 76 indicate by their position that the fingers of the prosthesis are relaxed and extended. It will be seen that the spring 92 has brought the arm 91 into contact with the stop bar 101 and that the spring 102 has caused the pawl 95 to disengage from the teeth of the quadrant 70 and to assume a position governed by the length of the link 97. The pawl 95 is still free to pivot upon the pin 96, and counter-clockwise rotation of the bell crank lever 93 will cause the pawl to pivot counter-clockwise, but the rotation will be resisted by the spring 102.

In Figure 12, the quadrant 70 is shown as having rotated in the direction consistent with closing the grip of the prosthesis and the bell crank lever 93 is shown as having been rotated slightly counter-clockwise, causing the pawl 95 to mesh with the quadrant 70. Meshing of the pawl 95 with the quadrant 70 in effect freezes the pawl in relation to the arm 91, so that further rotation of the pawl can be effected only by rotating the pawl, the arm 91, and the quadrant 70, as a unit. Conversely, the quadrant 70, which is in the actuating chain of linkage to the digital casing 27 and to the fingers 32 and 33, cannot move without causing movement of the pawl 95 and the arm 91. Rotation of the quadrant 70 consistent with opening the grip would be in a clockwise direction and would call for rotating the arm 91 clockwise as a part of the frozen unit. But the arm 91 still rests against the stop bar 101 and cannot rotate clockwise. The prosthesis is therefore locked in the position which the digital casing 27 and the fingers 32 and 33 have assumed. The only force effective to unlock the prosthesis other than movement of the bell crank lever 93, is the spring 102 which continues to urge disengagement of the pawl 95 from the quadrant 70. However, such disengagement cannot be accomplished without moving the link 97 and the bell crank lever 93, and the angle of leverage applicable to the bell crank lever through the link is so slight that the force of the spring 102 is substantially offset by the weight of the bell crank lever and the friction on the pins 94, 96, 98, and 100. Moreover, the pawl 95 tends to freeze to the quadrant 70 because of the friction of the multiplicity of teeth by which these members are engaged, and because the tangential thrust of the quadrant on the more distal teeth of the pawl is substantially directed at the pin 96 upon which the pawl would normally pivot.

To positively secure the locked grip of the prosthesis and to further tighten the grip, the bell crank lever 93 may be moved to the position shown in Figure 10. It will be observed that this movement has caused counter-clockwise rotation of the above-described frozen unit of quadrant 70, arm 91 and pawl 95, all rotating about the fixed shaft 71 as an axis in response to fulcrum action on the fixed pin 94, and pulling the arm 91 out of contact with the stop bar 101. The small counter-clockwise rotation of the quadrant 70 so effected acts through the upstanding arm 76 and the link 78 to cause a slight further grip-tensing movement of the digital casing 27 and the fingers 32 and 33. Furthermore, the pin 98 having now moved across the center line connecting the fulcrum pin 94 with the pin 96, a positive lock will have been established upon the prosthesis which cannot relax its grip without first further tightening it.

It will be understood that the object in locking the prohthesis by either the substantial lock described in connection with Figure 12 or the positive lock described in connection with Figure 10, is to relieve the amputee of the necessity of maintaining tensed muscles in order to maintain a grip. It will further be seen that the amount of additional tensing of the grip during the positive locking operation depends upon the distance which the arm 91 moves away from the stop bar 101. The furthermost counter-clockwise position which the arm 91 may assume is determined by the form and arrangement of the linkage connecting the two fixed pivotal points, i. e., the pin 94 and the shaft 71. The distance which the arm 91 moves to attain this furthermost position depends upon its starting point, which in turn depends upon the position of the stop bar 101. By orienting the stop bar to increase or to decrease the total permitted angular movement of the arm 91, the added tensing of the grip of the prosthesis may be increased or decreased. Thus by adjusting the stop bar 101 so that its highest shoulder, indicated at 103 in Figure 10, is directed towards the arm 91, the arm will be held at all times at its counter-clockwise limit of movement, and no tensing of the grip will occur when the prosthesis is locked. This adjustment is of great importance when incompressible objects are to be grasped and held for some period of time, as it prevents the necessity of placing excessive strain upon the grasping surfaces and the operating linkages of the prosthesis in order to release the grip.

The hereinbefore mentioned force-multiplying device is illustrated in a preferred form in Figures 14 and 15, and in a modified embodiment in Figure 16. Referring to Figure 14, a support frame 104 is pivotally mounted on a pivot 105 upon a base member 106 which as heretofore stated may be within the forearm casing 46 and secured thereto, or may be secured to some part of the amputee's body, such as the upper arm. The frame 104 supports a sprocket 107 of fixed relative position determined by the axle pin 108 and a swinging sprocket 109 mounted on the end of a lever 110 which swings on a fulcrum pin 111 affixed to the frame 104. The sprocket 109 is disposed at a greater distance from the pivot 105 than is the sprocket 107, so that a pull in one direction upon the sprocket 109 will overcome a pull of equal force but of opposite direction upon the sprocket 107 and will cause the frame 104 to tilt in the direction of the pull upon the sprocket 109. The lever 110 has an arm 112 terminating in a dog 113 engageable in a notch 114 in the base member 106. The dog 113 is urged to engagement with the notch 114 by a spring 115 connecting the other arm of the lever 110 with the frame 104, and when so engaged, it prevents tilting of the frame 104 relative to the base member 106. A chain 116, which may be inserted in the cable 60 shown in Figure 7 as a part thereof, traverses the sprockets 107 and 109 so as to turn them in opposite directions. The portion 117 of the chain 116 leading away from the sprocket 109 leads to shoulder harness or to cineplastic connections. The portion 118 of the chain leading away from the sprocket 107 leads to the lever 58, or to similar primary operating mechanism of the prosthesis.

The sprocket 107 is provided with a brake 120 which may be expanded or contracted by rotation of a triangular lever 121 having two of its corners pivotally secured to the ends of the brake band 122. A link 123 connects the third corner of the lever 121 to the arm 112 of the lever 110. A second link 124 connects one end of the brake band 122 and the attached corner of the lever 121 to the frame 104, thus providing a fulcrum upon which the lever 121 may rotate.

As long as no resistance is encountered, the chain 116 may run freely over the sprockets 109 and 107, both of which will turn freely. When, however, a resistance or pull occurs on the end 118 of the chain 116, as would happen when the prosthesis grasps an object, there is a resulting tendency for the frame 104 to tilt relatively to the base member 106. Tilting of the frame 104 will be momentarily prevented by the engagement of the dog 113 in the notch 114, but if the resistance is of sufficient force, a continued pull upon the end 117 of the chain 116 will cause the lever 110 to rotate upon the fulcrum pin 111, overcoming the resistance of the spring 115. The initial rotative movement of the lever 110 proruces an upward pull on the link 123, causing the triangular lever 121 to rotate and to set the brake 120. With the sprocket 107 no longer free to turn, and the chain 116 consequently held fast relatively to both sprockets, a further continued pull upon the end 117 of the chain is transmitted directly to the spring 115, causing the lever 110 to rotate further and to disengage the dog 113 from the notch 114, as shown in Figure 15. The entire force-multiplier then becomes a simple lever fulcrumed upon the pivot 105, producing a force multiplication in the ratio of the distances from the pivot 105 of the take-off points of the chain ends 117 and 118 from the sprockets 109 and 107, with a corresponding reduction in the travel of the increased reaction.

In the modification shown in Figure 16, a cable 126 traverses pulleys 127 and 128, of which the pulley 127 is mounted directly upon a frame 129 and the pulley 128 is mounted upon a rod 130 which extends slidably through the frame 129 and is urged outwardly by a spring 131. Lock nuts 132 limit outward movement of the rod 130 relative to the frame 129 and an adjustment nut 133 regulates the compressive tension on the spring 131. The cable 126 may be a part of the cable 60. The frame 129 is tiltably mounted on a pivot pin 134 in a base 135. A lever 136, having its fulcrum at the spindle 137 of the pulley 128, has oppositely extending arms 138 and 139. The arm 138 has a hooked end 140 engageable with a hook 141 on one end of a lever 142 pivoted on the frame 129. The other end of the lever 142 extends through the frame 129 and presses upon a leaf spring 143 secured to the base 135. The action of the leaf spring 143 and lever 142 is to urge the lever 136 to clockwise rotation about its fulcrum point 137, as seen in Figure 16, but a stop 144 acting upon the lever 142 limits the distance to which the lever 142 may follow the lever 136.

The pulley 127 has a brake 145, one end of which is held in relation to the frame 129 by a link 146, and the other end of which is attached to the arm 139 of the lever 136 by a link 147. The link 147 is pivotally mounted on the frame 129 by a pivot pin 148 and so serves as a lever to operate the brake 145.

The operation of the modified form of force-multiplier is in principle the same as that described in connection with the preferred form illustrated in Figures 14 and 15. As long as there is no resistance to the pull on the cable 126, the pulleys 127 and 128 rotate freely. Upon application of a sufficient resistance at the end of the cable departing from the pulley 127, the pulley 128 is pulled towards the right (as viewed in Figure 16) against the resistance of the spring 131. Such movement of the pulley 128 not only moves the whole lever 136 towards the right, but causes it to rotate in clockwise direction, due to pressure of the lever 142 upon the hook 140. The link 147 is consequently rotated in clockwise direction about the pivot pin 148, causing the brake 145 to tighten upon the pulley 127. When the pulley 127 is restrained from rotating, the entire frame 129 will tilt upon the pivot pin 134 and become a lever having the force ratio corresponding to the distances from the pivot pin 134 of the take-off points of the cable 126 from the pulleys 127 and 128. The hook 140 is swung out of contact with the lever 142 so that the spring 143 no longer affects movement of the frame 129.

In both the preferred and modified forms of force-multiplier, the latch mechanism provided in the one instance by the dog 113 and notch 114 and in the other instance by the hooks 140 and 141, holds the frame from over-tilting in a counter-clockwise direction when the tension on the muscle-motor end of the cable or chain is relaxed. When the force causing the prosthesis to grip is abated, the spring 61 moves the lever 58 to cause a pull upon the cable 60 in the opposite direction, and such a pull would tend to tilt the force-multiplier towards the prosthesis with resultant waste motion on the next application of gripping tension, were it not for the action of the latch mechanism.

With the possible application of a grip of considerable power, as provided by the locking and grip tensing mechanism and by the force-multiplier heretofore described, it becomes more than ever desirable to provide the amputee with means for sensing not only contact with an object, but the pressure which his prosthetic hand applies to an object. We therefore prefer to include in our improved prosthesis sensory devices of the kind illustrated in Figures 17 to 20. In Figures 17 and 18, we have illustrated a preferred form of sensory device indicating contactual pressure by tactile sensation and based on hydraulic principles of operation. A bladder 150 on the end of a finger of the prosthesis, preferably the index finger 32, is connected by a flexible tube 151 to a second bladder 152 held by suitable harness 153 to the skin of the stump of the amputee, indicated at 154. The bladders 150 and 152 have, respectively, flexible diaphragms 155 and 156, but are otherwise so rigid as to be non-expandable. The flexible tube 151 may be of rubber but has a wall of such thickness and tensile strength as to be non-expandable. The bladders 150 and 152 and the tube 151 are filled to capacity with a non-compressible fluid, shown at 157 in Figure 18. Consequently, any pressure upon the diaphragm 155 tends to dilate the diaphragm 156 and the pressure is transmitted to the skin of the amputee in proportion to its intensity at the finger tip. The tube 151 may be disposed entirely within the fingers and casings of the prosthesis, to maintain the esthetic appearance of the hand, and the prosthesis may be covered by a cosmetic glove without seriously impairing the effectiveness of the sensory device.

A sensory device modified to operate on electric principles is illustrated in Figures 19 and 20. A switch 160, of spring-resisted push-button type, is attached to the end of a finger so as to close an electric circuit 161 in response to finger-tip pressure. The circuit 161 includes storage batteries 162 which may be located at any convenient point in the amputee's clothing, and a vibrator disc 163 attached by harness 164 to the skin of the amputee's stump. Pressure at the finger tip sufficient to close the switch 160 is indicated to the amputee by the sensation of vibration on his skin. By making the switch 160 of the rheostat or variable bridge type, with its movable element spring-urged to the high resistance end and thence to open position, the intensity of vibration may be made to coincide with the intensity of pressure.

When the amputee wishes to grasp an object with the prosthetic hand herein described, he exerts tension upon the cable 69 by means of shoulder harness or cineplastic mechanism and so retracts the lever 58 and compresses the spring 61. As heretofore described in detail, retraction of the lever 58 causes flexion of the prosthesis at the joint between the upper hand casing 25 and the digital casing 27, and also at the medial joints of the fingers 32 and 33. The hand is thereby caused to close upon the object, and when contact with the object is attained, the sensory device will indicate the same by pressure or vibration upon the amputee's stump. The resistance afforded by the object will also bring into play the force-multiplier, to the extent that it may be desired and feasible, and the tension of the grip so produced will be indicated to the amputee by increased pressure or vibration upon his stump.

If the amputee wishes to hold the object for any length of time, he will move the bell crank lever 93 rearwardly, either with his other hand or by knocking it against some resistance, such as a table. If in his estimation the grip upon the object is already sufficiently tense, he will move the bell crank lever through only such part of its arc of movement as will lock the prosthesis in the position already attained. If, however, he wishes to increase the tension of the grip or to lock the grip more securely, he will move the bell crank lever to its furthermost rearward position. The amputee will learn, when handling a non-compressible object or a fragile one, to exert only moderate tension by means of the force-multiplier, so that subsequent operation of the locking mechanism neither strains the prosthesis nor crushes the object handled. In his estimation of the requisite tension he is, of course, guided in part by the sensory device.

To relax the grip, the amputee merely knocks the bell crank lever 93 forward, if it has previously been moved rearwardly, and relaxes the tension on the cable 69. The spring 61 in the primary operating mechanism, the springs 92 and 102 in the locking mechanism, and the springs 115 or 131 in the force-multiplier then restore all moving parts automatically to their open or relaxed positions.

It will readily be seen that the greater part of all the operating mechanism is disposed high up in the prosthesis towards the stump. The sensory device is largely located upon the stump itself; the quick disconnecting mechanism is centered at and above the wrist; the force-multiplier is either within the stump cuff casing 46 or above it on the arm itself; and the locking and grip tensing mechanism is closely adjacent to the wrist within the upper hand casing 25. The distal portion of the hand is therefore light in weight and not burdensome to the amputee. The improved ball-and-socket joints by which it flexes are also light and permit an increased articulation without adding to the weight. They also give the hand a more natural appearance than the customary tongue-and-groove joints and give better protection to the encased linkage. By having the index and middle fingers articulated to close upon the thumb with a palmar grip, the most common articular movement of the natural hand is closely simulated and is carried through efficiently by the operating mechanism with little fatigue to the amputee.

We claim:

1. A prosthetic device for attachment to an arm stump, comprising an upper casing simulating the upper part of the human hand, a second casing simulating the digital portion of a hand, said casings having mating semi-cylindrical end portions forming a substantially closed joint and being pivotally secured to each other, a plunger in said upper casing reciprocatably movable therein, means for connecting said upper casing to said arm stump, lever means pivotally secured to said arm stump, means connecting said lever means to a muscle motor, means for operably connecting said plunger to said lever means when said upper casing is connected to said arm stump, and linkage means connecting said plunger to said second casing for flexing said joint in response to movement of said plunger.

2. A prosthetic device for attachment to an arm stump, comprising an upper casing simulating the upper part and the thumb of a human hand, a second casing simulating the digital portion of a hand, including the third and fourth fingers and the proximal phalanges of the index and second fingers, said upper casing having a transverse opening at its distal end and said second casing having a semi-cylindrical portion enlarged to fit within and mating with said transverse opening to form a substantially closed joint and having an opening in said semi-cylindrical portion communicating with said transverse opening, additional casings simulating the distal portions of the index and second fingers and so shaped as to form ball-and-socket joints with the proximal phalanges of said fingers, a knuckle bar on said upper casing adjacent said transverse opening and having lugs extending through said transverse opening whereon said second casing is pivoted, movable means actuable by muscular movement of the wearer, linkage principally disposed within said upper casing and connecting said means with said second casing for causing arcuate movement of said second casing in response to movement of said means, and additional linkage principally disposed within said second casing and connecting said knuckle bar and said additional casings for causing arcuate movement of said additional casings in response to movement of said second casing.

JOHN E. CONZELMAN, Jr.
HERBERT B. ELLIS.
CLAYTON W. O'BRIEN.

REFERENCES CITED

The following references are of record in the file of this patent:

UNITED STATES PATENTS

| Number | Name | Date |
|---|---|---|
| 760,102 | Carnes | May 17, 1904 |
| 2,230,378 | Eberle | Feb. 4, 1941 |
| 2,464,577 | Hobbs | Mar. 15, 1949 |
| 2,427,974 | Otterman | Sept. 23, 1947 |

FOREIGN PATENTS

| Number | Country | Date |
|---|---|---|
| 315,024 | Germany | Sept. 22, 1919 |
| 828,272 | France | Feb. 7, 1938 |

OTHER REFERENCES

Terminal Research Reports on Artificial Limbs by Committee on Artificial Limbs, National Research Council; received in Div. 55 of the Patent Office Nov. 13, 1947, pp. 87 and 88.

"Artificial Limbs" by Florent Martin, Geneva (1925), pp. 42 and 43. A copy is in Div. 55 of the Patent Office.